Patented Apr. 15, 1930

1,755,099

UNITED STATES PATENT OFFICE

CHARLES E. BURKE, OF WILMINGTON, DELAWARE, ASSIGNOR TO E. I. DU PONT DE NEMOURS & COMPANY, OF WILMINGTON, DELAWARE, A CORPORATION OF DELAWARE

POLYMERIZATION OF KETONE-FORMALDEHYDE CONDENSATION PRODUCTS

No Drawing.  Application filed June 6, 1928. Serial No. 283,457.

This invention relates to the condensation products of ketone formaldehyde and more particularly to the polymerization of such ketone formaldehyde condensation products.

It has long been known that formaldehyde reacts with ketones to form polymerizable condensation products but heretofore the final polymerization has been carried out by mixing the condensation product with inorganic alkaline materials and then heating.

This invention has as an object the polymerization of ketone formaldehyde condensation products by the use of organic compounds. A further object is to utilize the so formed polymers in plastic compositions. A still further object is to utilize these polymers in coating compositions. Other objects will appear hereinafter.

These objects are accomplished by the following invention which consists in polymerizing ketone-formaldehyde condensation products by the use of organic compounds in place of the customary inorganic alkaline materials.

As one embodiment of my invention I may, for example, prepare the condensation product of acetone formaldehyde by any of the well known methods described in the literature, and add to this product approximately 1% of urea. On heating at, say 100° C., the material polymerizes to a hard, infusible resin. In place of urea I may use an organic amine such as aniline, dimethyl aniline, pyridine, piperidine, diethylamine, guanidine, etc., and the rate of polymerization varies with the strength of the accelerator used, with the amount used and with the temperature. For instance with 1% of pyridine at 100° C. the material polymerizies in approximately 30 minutes. With more pyridine, or at higher temperatures, it polymerizes more quickly. In place of the acetone-formaldehyde condensation product I may use any ketone-formaldehyde condensation product.

The ketone-formaldehyde condensation products before polymerizing are solvents for cellulose derivatives and these products mixed with cellulose derivatives can be polymerized to form infusible resins. The following are examples of compositions so formed:

| | Grams |
|---|---|
| Pyroxylin | 1,050 |
| Acetone formaldehyde condensation product | 340 |
| Urea | 16.9 |
| Alcohol 2B | 500 |

The pyroxylin and alcohol are first placed in a mixer and mixed until thoroughly broken up, after which the condensation product and urea are added. The material may then be worked on rolls, cake pressed and sheeted in the customary manner.

| | Grams |
|---|---|
| Pyroxylin | 1,050 |
| Camphor | 340 |
| Acetone formaldehyde condensation product | 340 |
| Urea | 16.9 |
| Alcohol 2B | 500 |
| Hexamethylenetetramine | 10 |

As in the previous example, this material is likewise first worked up in a mixer and may then be rolled, cake pressed and sheeted.

| | Grams |
|---|---|
| Pyroxylin | 1,050 |
| Acetone formaldehyde condensation product | 534 |
| Camphor | 170 |
| Urea | 16.9 |
| Alcohol 2B | 500 |
| Guanidine | 16.8 |

This material is first worked up in a mixer as in the previous examples and may later be rolled, cake pressed and sheeted. After sheeting, it may be placed in a seasoning oven until free from volatile solvent, after which it may be blown, pressed, or in other ways treated similarly to regular pyroxylin stock.

If it is so desired, the composition may be used in conjunction with a filler as in the following example:—

| | Grams |
|---|---|
| Pyroxylin | 530 |
| Acetone formaldehyde condensation product | 250 |
| Diethyl phthalate | 236 |
| Gypsum | 1,590 |
| Aluminum palmitate | 10 |
| Formin | 7.5 |

This material may be sheeted directly from the rolls and placed in a seasoning oven, and after drying may be ground and used as a molding powder.

In place of nitrocellulose, I may use any cellulose derivative, as for instance, acetyl cellulose of which the following is an example:—

| | Grams |
|---|---|
| Acetyl cellulose | 1,050 |
| Acetone formaldehyde condensation product | 340 |
| Acetone | 500 |

The polymers herein described may also be used in making coating compositions and the following is an example of such a coating composition:—

| | Grams |
|---|---|
| Acetone formaldehyde condensation product | 100 |
| Piperidine | 1 |

The product is spread out in a thin film and baked at 140° C. to 150° C., whereupon it forms a hard film. Softeners may be incorporated in the film according to the following example:—

| | Grams |
|---|---|
| Acetone formaldehyde condensation product | 100 |
| Glyceryl dibenzyl ether | 2 |
| Piperidine | 1 |

The use of organic amines in the polymerization of the condensation products, as described herein, has decided advantages among which are the facts that many of them are liquid and are readily and completely soluble in the condensation product and, if so desired, amines may be selected which are volatile and thus any unused portion can be volatilized and removed from the finished product.

As many apparently widely different embodiments of this invention may be made without departing from the spirit and scope thereof, it is to be understood that I do not limit myself to the specific embodiments thereof except as defined in the appended claims.

I claim:

1. Process which comprises polymerizing a ketone formaldehyde condensation product in the presence of an organic amine.

2. Process which comprises polymerizing a ketone formaldehyde condensation product in the presence of urea.

3. Process which comprises polymerizing an acetone formaldehyde condensation product in the presence of an organic amine.

4. Process which comprises polymerizing an acetone formaldehyde condensation product in the presence of urea.

5. Process which comprises polymerizing an acetone formaldehyde condensation product with urea, in the presence of nitrocellulose and alcohol.

6. Composition of matter which contains a cellulose derivative, a ketone formaldehyde condensation product and an organic amine.

7. Composition of matter which contains a cellulose derivative, an acetone formaldehyde product and an organic amine.

8. Composition of matter which contains nitrocellulose, an acetone formaldehyde condensation product, urea and alcohol.

In testimony whereof, I affix my signature.

CHARLES E. BURKE.